Figure 1:
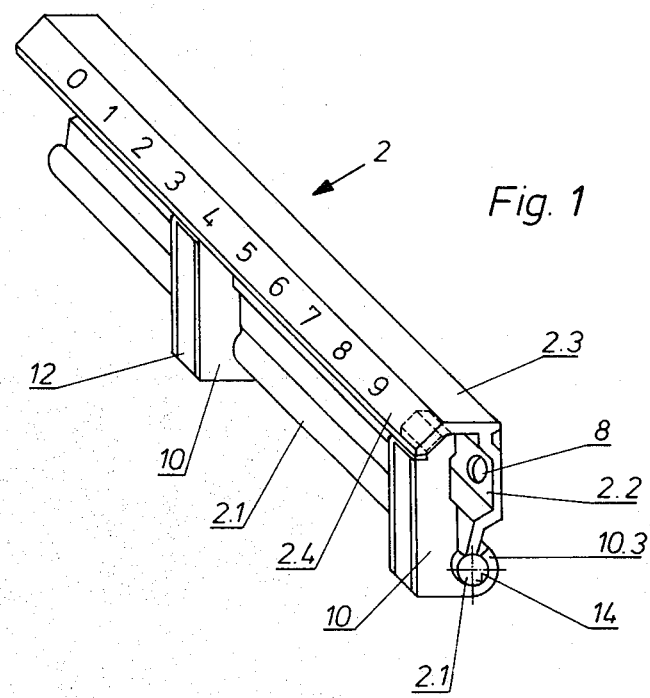

United States Patent [19]
Sillmann

[11] 3,942,276
[45] Mar. 9, 1976

[54] CODING STRIP FOR GUIDING CONTAINERS

[75] Inventor: Manfred Sillmann, Emmendingen, Germany

[73] Assignee: Erwin Sick Optik-Elektronik, Waldkirch, Germany

[22] Filed: Sept. 13, 1974

[21] Appl. No.: 505,836

[30] Foreign Application Priority Data
Sept. 22, 1973 Germany............................ 7334447

[52] U.S. Cl..................................... 40/359; 40/360
[51] Int. Cl.² ......................................... B42F 21/00
[58] Field of Search ............ 40/359, 10, 16.4, 16.6, 40/17, 360, 23 A

[56] References Cited
UNITED STATES PATENTS
3,355,831   12/1967   Shirley............................. 40/360 X FOREIGN PATENTS OR APPLICATIONS
92,008    10/1968   France.................................. 40/359
452,481    5/1968   Switzerland.......................... 40/359
1,536,743   1/1970   Germany .............................. 40/359

*Primary Examiner*—John H. Wolff
*Attorney, Agent, or Firm*—Cushman, Darby & Cushman

[57] ABSTRACT

A coding strip for attachment to a container which is routed to one of several destinations defined by a machine readable code thereon including a support member having a circular cross-sectional rail upon which a slide member is mounted for longitudinal movement along the rail. A spring is mounted on the slide and engaging the support member for urging the slide into a locking position in which ribs on the support member block longitudinal movement. The slide member can be moved by pivoting into a position in which the slide slips by the ribs.

11 Claims, 2 Drawing Figures

U.S. Patent  March 9, 1976  3,942,276

CODING STRIP FOR GUIDING CONTAINERS

The invention relates to a coding strip for a coding device for guiding containers, with at least one slide with an index marker that can be moved longitudinally along the coding strip and fixed on it as well.

Coding strips of this sort are put on containers, and bear markers that make it possible to machine read the code on the coding strip by means of certain methods such as reflex light barriers or light beam controllers, as the containers move along their transport course. Thus, the course of the container within, for example, a factory, can be guided to one of several possible destinations. If light is used, then the slides each bear a reflector, especially triple reflectors. The coding strip is usually arranged to face the direction of movement and extends parallel to the bottom surface of the container with respect to the side wall to which it is attached. The coding strip thus moves forward with the container as it is transported in longitudinal direction.

For coding, it is necessary that one or more slides be mounted in longitudinal direction on the coding strip. In the case of existing coding strips, plates of ferromagnetic material are held on in their final position by magnets and are used as markers. However, this method of holding the markers is not sufficient since the containers occasionally bump into each other. Upon the violent braking that results, the plates are often pushed in a longitudinal direction and then gripped by other magnets, thus at the wrong place, so that the containers arrive at the wrong destination.

An object of the present invention is to create a coding strip that makes it possible to mount the slides in a simple manner, but whereby the slides are held in their final position by form-locking, so that they cannot be forced into another position as a result of impact with other containers.

For installing a coding strip, the slide is released in counteraction to a spring. Depending upon its construction, it is either pressed against the coding strip or pulled away from it. After release, it can be moved in longitudinal direction of the coding strip until it reaches the desired position. Then it is allowed to snap back into locking position due to the spring effect. It is then held form-locked in the new position.

Figure 2:
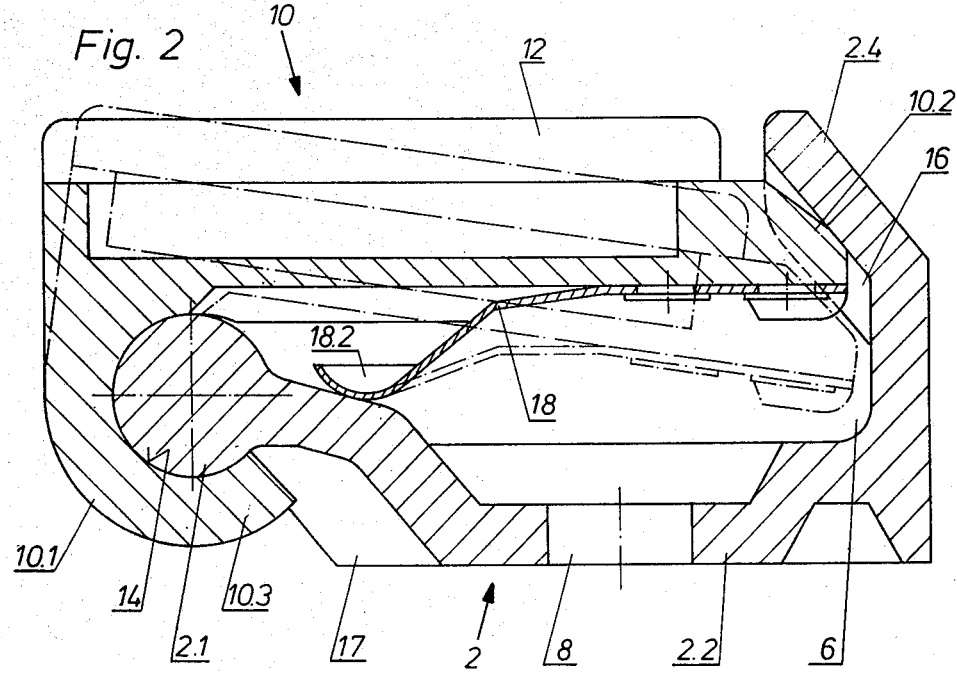

One embodiment of this invention is described in the following, with reference to the drawings in which FIG. 1 shows a coding strip with two slides in perspective, and FIG. 2 is a cross-section of a slide and a coding strip as shown in FIG. 1.

Referring to FIGS. 1 and 2, the coding strip 2 consists of a piece of profile material i.e., a support member that has a rail 2.1 on one end of circular cross-section, while on its other end, the back face 2.2 and flat profile pieces 2.3 (top) and 2.4 (front overhang) form a flute 6. The back face can have screw holes 8 for attaching it to an object. Code numbers are placed as shown on the outside of the flat profile piece 2.4 by any suitable means.

Two slides (slide members) 10 are attached to the coding strip of FIG. 1. Each slide has a radiation reflector 12. Each slide 10, as shown in FIG. 2, has a section 10.1 defining a groove 14, that surrounds the rail 2.1 of the coding strip by more than 180°, so that the slide is form-locked onto this rib. There is sufficient clearance for moving the slide along the rib. The slide catches in the trough 6 of the coding strip with the right end 10.2 as shown in FIG. 2. The end 10.2 and the profile piece 2.4 form opposite buffers. The flute 6 of the coding srip is subdivided by ribs 16, in such a way that the slide 10 fits right between two ribs, whereby the slide and ribs interfere with each other in a locking position to prevent relative longitudinal movement therebetween. The thickness of the ribs and their distance from each other and the width of the slide are adjusted to each other in such a way that the slide can be aligned with each number of the coding strip. In addition to the crossribs 16, or instead of these crossribs, other crossribs 17 at the same intervals, can be provided on the back face 2.2 of the coding strip. The end 10.3 of the slide, which forms the edge of the groove 14, fits between these crossribs when the slide is in the solid line position shown in FIG. 2 i.e., in the locked position. Attached to each slide is a plate spring 18, that presses with its free end 18.2 against the back face 2.2 of the coding strip to press the associated slide against the profile piece 2.4. For longitudinal movement, the end 10.2 of the slide is manually pivoted away from face 2.4 and rib 16 against the urging of plate spring 18 until longitudinal movement is no longer impeded by either the crossribs 16 or the crossribs 17. After the slide has been moved into its new position and released, spring 18 pivots slide 10 back into a locked position.

The groove 14 need not have a greater compass than 180° if the slide is pressed against the rail 2.1 for instance by a spring. The stopping agents can be of another sort. For instance, the slide can have a rib that fits into the grooves of the coding strip. Instead of that, there could also be projections of the coding spring that fit into grooves of the slide. Instead of the coding strip's grasping the free end of the slide, the free slide end could also grip the coding strip. The springs could press the slide inward as well as outward, but in such a way that a form-locked stop connection is formed. Furthermore, it is not necessary that the slide be hinged. It could also be embraced by the coding strip at the end where its hinge is shown here, or the slide could embrace the coding strip on both ends. In such cases, also, the catch effect would be accomplished by a spring effect.

Many other changes and modifications of the above-described embodiment of the invention can of course be carried out without departing from the scope thereof. Accordingly, that scope is intended to be limited only by the scope of the appended claims.

What is claimed is:

1. A coding strip which is one part of a coding device and which attaches to a transport container, said strip being code machine readable by another part of said coding device for guidance of said container to one of several possible destinations according to the code indicated, comprising:

support member means having first longitudinal member and having a portion remote from that member and parallel thereto defining a rail, means for fixedly securing said support member means to said transport container, slide member means mounted on said rail for movement thereon along said code bearing member for indicating machine readable codes by means of spaced locked positions therealong, said support and slide member means having interfering portions for defining said locked positions to prevent relative movement therebetween when said member means are urged into a locked position, and spring means disposed for engaging said support and slide member means and urging said member means into any of said locked positions in which said slide member means is prevented from moving along said rail.

2. A coding strip as in claim 1 wherein said rail has a portion of circular cross section and said slide member means has a portion which curves around said rail portion.

3. A coding strip according to claim 2 wherein said portion of said slide member means curves around said rail by at least 180°.

4. A coding strip as in claim 1 wherein said code member includes an overhanging edge spaced from said rail and said slide member means is urged by said spring into a position engaging said overhanging edge.

5. A coding strip as in claim 4 wherein said support member means has at least first and second spaced ribs along the direction said slide member means moves for preventing movement of said slide member means along said rail when said slide member means is in said locking position.

6. A coding strip as in claim 5 wherein said ribs are located on said overhanging edge.

7. A coding strip as in claim 4 wherein said support member means has a rib on its portion remote from said overhanging edge for preventing movement of said slide member means along said rail when said slide member means is in said locked position.

8. A coding strip as in claim 1 wherein said spring is attached to the slide member means, its free end bearing against the support member means.

9. A coding strip according to claim 1 wherein said slide member means is provided by a radiation reflecting portion.

10. A coding strip according to claim 1 wherein a link is provided by said support and slide member means enabling a relative longitudinal motion between both member means in a non-locking position of both member means.

11. A coding strip which is one part of a coding device and which attaches to a transport container, said strip including a code machine readable by another part of said coding device for guidance of said container to one of several possible destinations according to the code indicated, comprising:

support member means having a rail, means for fixedly securing said support member means to said transport container, machine readable coded slide member means mounted on said rail for movement thereon for indicating codes by means of spaced locked positions therealong, said support and slide member means having interfering portions for defining said locked positions to prevent relative movement therebetween when said member means are urged into a locked position, and spring means disposed for engaging said support and slide member means and urging said member means into any of said locked positions in which said slide member means is prevented from moving along said rail.

* * * * *